(12) United States Patent
Reuche (10) Patent No.: US 12,069,762 B2
(45) Date of Patent: Aug. 20, 2024

(54) METHOD FOR CONFIGURING AT LEAST ONE RADIO RESOURCE OF A COMMUNICATION NETWORK, NODE DEVICE, AND COMMUNICATION NETWORK

(71) Applicant: SAGEMCOM BROADBAND SAS, Rueil Malmaison (FR)

(72) Inventor: Anthony Reuche, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 183 days.

(21) Appl. No.: 17/365,427

(22) Filed: Jul. 1, 2021

(65) Prior Publication Data

US 2022/0007452 A1    Jan. 6, 2022

(30) Foreign Application Priority Data

Jul. 2, 2020 (FR) ..................... 2007010

(51) Int. Cl.
  *H04W 76/25* (2018.01)
  *H04B 17/382* (2015.01)
  *H04W 76/15* (2018.01)

(52) U.S. Cl.
  CPC .......... *H04W 76/25* (2018.02); *H04B 17/382* (2015.01); *H04W 76/15* (2018.02)

(58) Field of Classification Search
  CPC ..... H04W 76/25; H04W 76/15; H04W 16/10; H04W 84/12; H04W 24/02; H04B 17/382; H04B 7/15542
  See application file for complete search history.

(56) References Cited

U.S. PATENT DOCUMENTS

2015/0078162 A1   3/2015  Prakash et al.
2017/0272317 A1*  9/2017  Singla ................. H04L 41/0806

FOREIGN PATENT DOCUMENTS

CN        108964806 A    12/2018
WO    WO-2014180280 A1 *  11/2014  ............ H04W 76/15

OTHER PUBLICATIONS

Chen et al, Link Establishment Method, Base Station and System, Nov. 13, 2014, WO, English translation of WO 2014180280. (Year: 2014).*

(Continued)

*Primary Examiner* — Michael K Phillips
(74) *Attorney, Agent, or Firm* — Williams Mullen; R. Brian Drozd (57) ABSTRACT

A method for configuring radio resources distributed in communication nodes of a communication network is provided. Each communication node includes radio resources. The method includes collection, for each of said radio resources, of configuration parameters, and of at least one parameter representing a level of reception by this radio resource; detection, from said radio-resource configuration parameters collected and from at least one of the parameters representing a reception level, of a common configuration parameter value and a proximity between a radio resource of a first communication node and a radio resource of a second communication node from the communication nodes, of such a nature as to cause interference in communications between and first and second communication nodes, and then a configuration of at least one radio resource of the second communication node with a new configuration. The value of the common configuration parameter is absent from the new configuration.

7 Claims, 4 Drawing Sheets

(56) References Cited

OTHER PUBLICATIONS

Jaber et al., "5G Backhaul Challenges and Emerging Research Directions: A Survey", Apr. 20, 2016, IEEE Access, pp. 1743-1766 (Year: 2016).*
Mar. 24, 2021 Search Report issued in French Patent Application No. 2007010.
Wi-Fi Alliance: "Wi-Fi Certified Data Elements;" URL: https://www.wi-fi.org/download.php?file=/sites/default/files/private/Wi-Fi_CERTIFIED_Data_Elements_Technology_Overview_0.pdf; pp. 3-6; Jun. 30, 2019.
Anonymous; "Frequency-hopping spread spectrum—Wikipedia;" URL: https://en.wikipedia.org/w/index.php?title=Frequency-hopping_spread_spectrum&oldid=93725081; Jan. 23, 2020.

* cited by examiner

METHOD FOR CONFIGURING AT LEAST ONE RADIO RESOURCE OF A COMMUNICATION NETWORK, NODE DEVICE, AND COMMUNICATION NETWORK

TECHNICAL FIELD

At least one embodiment relates to the field of wireless communication networks conforming to one of the IEEE 802.11 standards ("Institute of Electrical and Electronics Engineers"), i.e. the field of wireless communication networks commonly referred to as "Wi-Fi" networks. At least one embodiment relates more particularly to a method for configuring one or more radio resources of at least one communication node device in such a network.

PRIOR ART

A wireless communication network (hereinafter "network") conforming to one of the IEEE 802.11 standards typically comprises a plurality of nodes. Each node is an electronic device comprising at a minimum a radio-frequency module for establishing communications conforming to one of the IEEE 802.11 standards, or in other words conforming to one of the Wi-Fi standards. Such a network typically comprises an electronic device, commonly called an access point (AP), and a plurality of so-called user (or client) electronic devices able to establish wireless connections with the access point and/or with each other. In a residential environment, the electronic device, access point, is typically a "box" supplied by an internet operator, i.e. a home gateway or residential gateway. The user electronic devices are typically computers, televisions, tablets or so-called smartphones. It is also commonly said that the user electronic devices are associated "in Wi-Fi" with the access point.

The architecture of a Wi-Fi network may also be distributed, in order for example to extend the range of the network or to increase the performance thereof, by the use of a plurality of node devices implementing functionalities of wireless access points. The architecture of a distributed Wi-Fi network is different from the previous architecture briefly described. A Wi-Fi network, conventional or distributed, comprises at a minimum two subnetworks:

- a so-called "gathering", "infrastructure" or "backhaul" subnetwork, making it possible to connect the nodes to the home gateway in the case of a conventional Wi-Fi network, or making it possible to connect the communication nodes to each other and to constitute a network infrastructure in accordance with a network architecture (for example in a tree, in a star or a mesh network); this gathering network may be a wireless network (for example Wi-Fi), a cable network (for example Ethernet) or a mixture of the two,
- a so-called "user" or "frontal" (or "client") Wi-Fi subnetwork ("fronthaul" subnetwork), allowing a connection of so-called "user" (or "client") electronic devices to the distributed or conventional Wi-Fi network.

The number of communication nodes of a distributed network, such as for example a network having a mesh architecture, may be great and the proximity of two communication nodes or access points of the backhaul subnetwork risks causing interference in the transmissions implemented by these communication nodes or access points, and diminishing accordingly the overall performance of the backhaul subnetwork and therefore the performance of accesses to the network by the user devices.

Solutions exist and aim to implement a frequency scanning so as to analyse the electromagnetic environment of a node and to select a frequency band and a transmission channel that is not disturbed or only a little disturbed. The situation can however be improved.

DISCLOSURE OF THE INVENTION

For this purpose, the object of the invention is a method for configuring radio resources distributed in a plurality of communication nodes of a communication network, each communication node comprising one or more radio resources, the method comprising:

- collecting, for each of said radio resources, configuration parameters, and at least one parameter representing a reception level of a signal sent or received by this radio resource,
- detecting, from said configuration parameters of radio resources collected, and from at least one of said parameters representing a reception level, a common configuration parameter value and a proximity between a radio resource of a first communication node and a radio resource of a second communication node from said plurality of communication nodes, of such a nature as to cause interference in the communications between the first and second communication nodes,
- configuring at least the radio resource of the second communication node having a common configuration parameter value with a new configuration, said value of said common configuration parameter being absent from the new configuration.

The words "a common configuration parameter value" are to be interpreted here as a common numerical value, such as for example a subnetwork identifier, or an alphanumeric string value, such as an alphanumeric identifier, such as an SSID or a channel number for example.

Advantageously, it is thus possible to optimise the use of the radio resources of the same network, so as to be able to use the greatest number of radio resources with the least possible interference between them.

The method according to the invention may also comprise the following features, considered alone or in combination:

- The method is executed in a communication node of said communication network known as the "master node". Advantageously, the allocation of the radio resources can be centralised in a single node of a network to facilitate the detection of any interference.
- The communication network comprises a so-called backhaul subnetwork and a so-called fronthaul user network, the radio resources of the first and second communication nodes are configured to implement transmissions in the backhaul subnetwork before the step of configuring the second radio resource with the new configuration, and the second radio resource is configured to implement transmissions in the fronthaul subnetwork after the configuration step, the method further comprises a step of detecting at least one cable link between the first and second node networks. Advantageously, it is thus possible to optimise the performance of the backhaul subnetwork while making more radio resources available to the fronthaul user subnetwork.
- The step of detecting at least one cable link comprises an exchange of messages between the first and second node devices via interfaces configured for being connected by a cable link. Thus, it is easy to substitute an already existing cable link for a wireless link, in the event of interference of communications relating to this wireless connection.

At least one parameter representing a reception level is a so-called RSSI reception power level of a signal coming from an antenna of a communication node.

At least one configuration parameter having a common value between two communication nodes is from the group: an SSID, a BSSID, a frequency band, a channel or a bandwidth. Advantageously, it is thus possible to consider groups of communication nodes in the communication network and to analyse the individual and/or collective performance of these groups of nodes.

Another object of the invention is to propose a communication node device configured for implementing transmissions with a plurality of communication nodes of a communication network and for configuring one or more radio resources distributed in the plurality of communication nodes, each communication node device comprising one or more radio resources, the communication node device being configured for:

collecting, for each of said radio resources, configuration parameters, and at least one parameter representing a reception level of a signal sent or received by this radio resource, detecting, from said configuration parameters of radio resources collected, and from at least one of said parameters representing a reception level, a common configuration parameter value and a proximity between a radio resource of a first communication node and a radio resource of a second communication node from said plurality of communication nodes, of such a nature as to cause interference in the communications between the first and second communication nodes, configuring at least one radio resource of the second communication node with a new configuration, said common value of said configuration parameter being absent from the new configuration.

Another object of the invention is a communication network comprising a plurality of node devices as aforementioned.

The invention also relates to a computer program product comprising program code instructions for performing the steps of the previously described method when the program is executed by a processor, as well as an information storage medium comprising such a computer program product.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
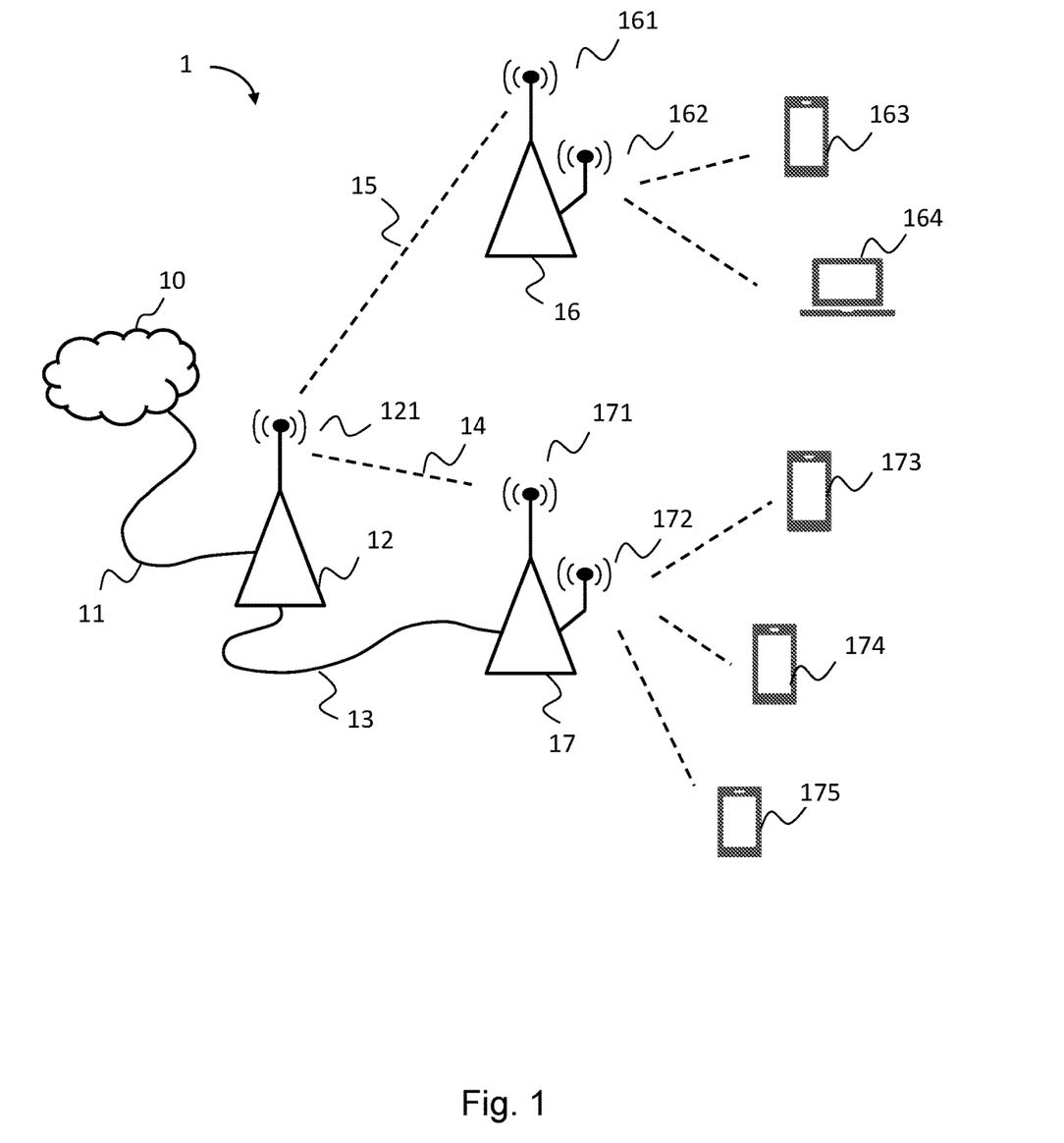
FIG. 1 illustrates a communication network comprising a plurality of communication nodes wherein at least one communication node is configured for implementing a configuration of at least one radio source by executing a method according to the invention.

FIG. 1 illustrates schematically a communication network 1 of the local area network type comprising a wireless-communication coverage-extension system. For example, the communication network 1 is a home network. The communication network 1 is connected to a wide area network 10. According to one embodiment, the wide area network 10 is the internet. The communication network 1 is connected to the wide area network 10 by means of a network gateway 12 configured for implementing all the functions useful to a connection between a wide area network and a local area network. The network gateway 12, also commonly referred to as a "gateway", is connected to the wide area network 10 by means of a connection link 11. The connection link 11 is for example a telephone subscriber line, and the connection uses for example an ADSL (the abbreviation of asymmetric digital subscriber line) technology. In another example, the connection link 11 forms part of a network for conveying data by optical channels, such as a Fibre To The Home (FTTH) optical fibre network. The network gateway 12 comprises a radio resource 121 and an Ethernet cable interface (not shown in the figure) for a connection to a local network, and implements communication-node functions. The communication network 1 furthermore comprises two other communication nodes 16 and 17. According to one embodiment, the communication node 17 is an electronic device of the digital television receiver-decoder type, commonly referred to as a set-top box, which also comprises an Ethernet connection interface (not shown in the figure), for a connection to a local area network, and the communication node 16 is a wireless local area network repeater in the form of a Wi-Fi relay terminal for a wireless local communication network. The communication node 17 comprises two radio resources 171 and 172 and the communication node 16 comprises two radio resources 161 and 162. The communication nodes 16 and 17 are configured for communications with the network gateway 12 and constitute a backhaul subnetwork of the communication network 1. Electronic devices known as user devices 163, 164, 173, 174 and 175 are connected to the communication network 1 by means of the radio resources of the communication nodes 16 and 17. The user devices 163 and 164 are connected to the communication network 1 by means of the radio resource 162 of the communication node 16 and the user devices 173, 174 and 175 are connected to the communication network 1 by means of the radio resource 172 of the communication node 17. According to one embodiment, the user devices 163, 173, 174 and 175 are intelligent telephone devices also commonly referred to as smartphones, and the user device 164 is a portable computer also commonly referred to as a laptop. The connections between the communication nodes 16 and 17 and the user devices 163, 164, 173, 174 and 175 constitute a user subnetwork known as a "frontal" or "fronthaul" subnetwork of the communication network 1. According to one embodiment, all the communication nodes of the local area network 1, namely the network gateway 12, the set-top box 17 and the relay terminal 16, as well as the user devices 163, 164, 173, 174 and 175, are configured for implementing wireless communications according to characteristics and protocols in accordance with one of the IEEE 802.11 standards.

According to one embodiment, the communication network 1 is a distributed network such as a mesh Wi-Fi network for example, the communication node 12 furthermore implementing the "master node" functionality.

According to another embodiment, the communication network 1 is a network of the conventional Wi-Fi network type wherein the user devices 163, 164, 173, 174, 175 and the communication node 17 are connected to the communication network 1 by means of the radio resources of the communication node 12.

In the example described on FIG. 1, a cable link 13 of the Ethernet type exists between the communication node 12 and the communication node 17. When installing network equipment two node devices are frequently connected by a cable link of the Ethernet type. This is particularly true when a user connects equipment of the set-top box type, such as the communication node 17, to equipment of the gateway type, such as the network gateway 12. This is because it appears to be usual, in the context of a home local network and for a user who is sometimes a novice with regard to communication networks, to operate initially via a cable link, and then to configure one or more wireless connections between items of equipment, in order to gradually ensure correct functioning of the equipment interconnected throughout the installation. Thus, it is not rare, in a home local network such as the communication network 1 described in the present example, for a cable connection to remain, although a wireless connection has then been established between two items of equipment of the communication network. With regard to the arrangement of the equipment of the same communication network, it is also not rare for two items of equipment, or more, to be disposed close to each other, or even stacked, so as to limit the space requirement thereof. However, as numerous items of network equipment implementing communication node functions now often comprise one or more radio resources, a great proximity or an arrangement in the form of a stack is of such a nature as to create interference between these radio resources. This interference is then prejudicial to the overall performance of a communication network, and particularly to the performance of the backhaul subnetwork, in a context such as the one described by FIG. 1.

In another example, the cable link 13 is a link using a technology of the powerline or PLC type, this link consisting of electrical cables or leads or portions of electrical cables or leads, and being adapted for implementing a reliable data transport connection between the communication node 12 and the communication node 17.

According to one embodiment, a method for configuring radio resources advantageously makes it possible to detect a proximity between radio resources of two communication nodes and to reprogram one or other of these two communication nodes so as to optimise the overall performance of the network. Thus, it is possible to use a large number of radio resources while minimising the risk of interference between these resources.

Advantageously, a configuration method, or more exactly a reconfiguration method according to the invention, makes it possible to collect information relating to the configuration of each of the radio resources of a communication network such as the communication network illustrated in FIG. 1 and to detect, from the information collected, a proximity between two radio resources, said proximity being of such a nature as to cause interference in the communications between these two items of equipment.

Thus, it is advantageously possible, for example, to use a cable link present between two close items of equipment of a backhaul subnetwork to implement communications between them, and to reconfigure a radio resource operating in the backhaul subnetwork, so that a fronthaul subnetwork connected to the backhaul network profits from this radio resource, thus facilitating a good-quality connection for user devices connected to the fronthaul network.

Figure 2:
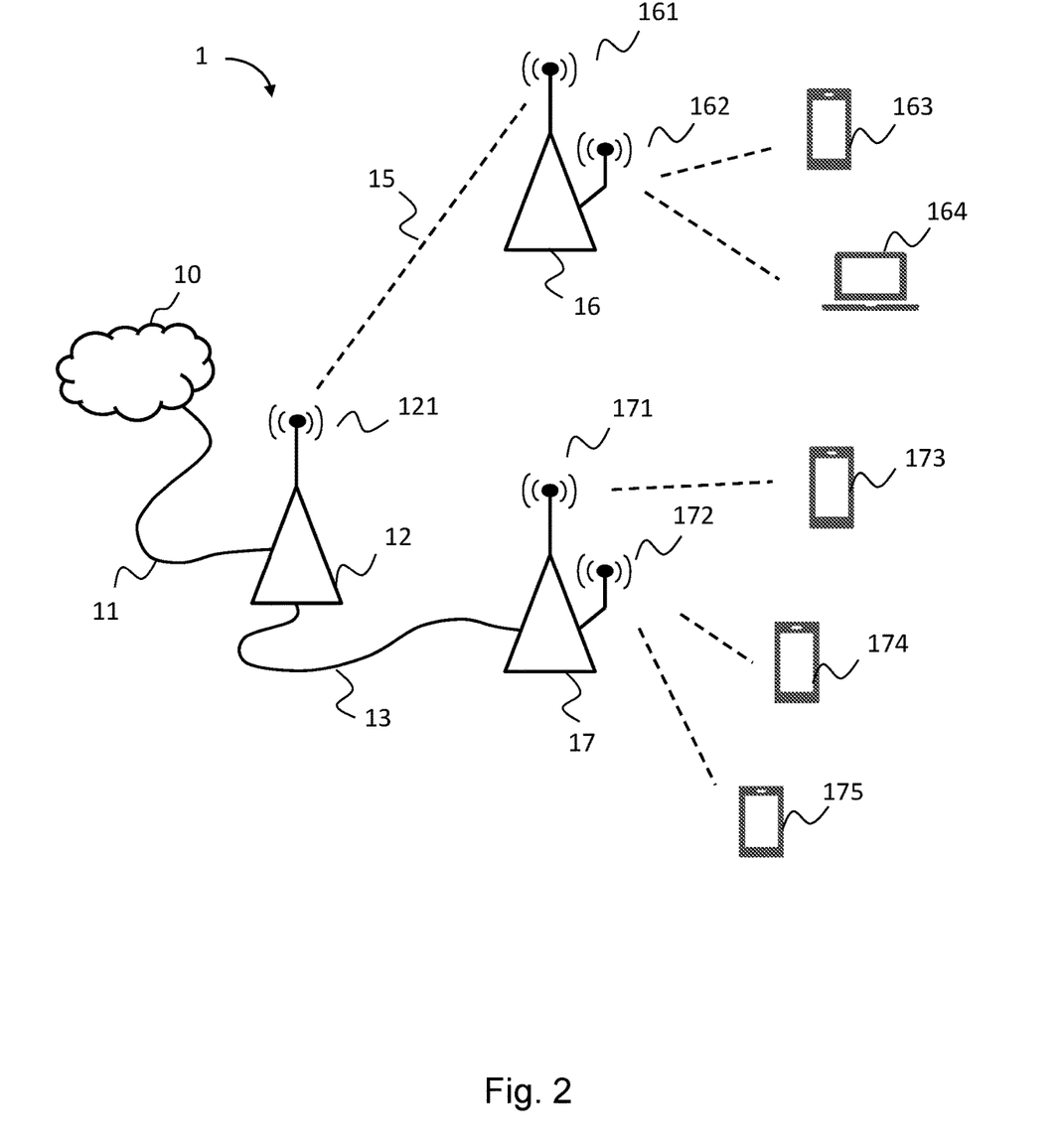
FIG. 2 illustrates the communication network already shown in FIG. 1, after reconfiguration of a radio resource by means of the method for configuring at least one radio resource of the communication network.

FIG. 2 illustrates an example of a configuration, or more exactly of a reconfiguration, of the communication network 1 by the radio-resource configuration method according to the invention. Advantageously, implementing the method makes it possible to detect the presence of the cable link 13 between the communication nodes 12 and 17, able to be substituted for the wireless link 14, for communications in the backhaul subnetwork comprising the communication nodes 12, 16 and 17. A proximity between two radio resources, of such a nature as to cause interference between these two nodes, can be detected by collecting information, such as configuration parameters, relating to these radio resources. Configuration parameters can be collected in several ways. According to one embodiment, information can be collected by making a frequency scan using a radio resource of a communication node and then analysing the reception signals coming from other radio resources. Thus, a radio resource of a communication node can be configured successively, for each of the frequencies at which it can be configured for making transmissions, so as to analyse the radio signals received for these successive configurations, as well as the power of the signal received. Thus, the method according to the invention advantageously makes it possible to detect a great proximity between the communication nodes 12 and 17, when the network gateway 12 and the set-top box 17 are superimposed. The method according to the invention furthermore makes it possible to detect the presence of the cable link 13, so that communications made by the wireless link 14 between the communication nodes 12 and 17 are made via the cable link 13 after reconfiguration, which advantageously makes it possible to reprogram the radio resource 171 for use in the fronthaul subnetwork, and therefore for the connection of a user device. FIG. 2 illustrates a connection of the user device 173 to the communication network 1 via the radio resource 171 of the set-top box 17, after reconfiguration thereof. This reallocation of the radio resource 171 in favour of the fronthaul subnetwork is particularly advantageous since it appears that improving the overall performance of a communication network is usually dependent on improving the performance of the backhaul subnetwork.

According to one embodiment, configuration parameters of the various radio resources are collected not during a frequency scan but in accordance with protocol exchanges implemented between the various communication nodes of the communication network 1. For example, a given communication node may address a request to all or some of the other communication nodes, the request being aimed at obtaining information representing the operation of each of the radio resources, i.e., for example, the operating channel, the SSID used, the BSSID used, and the reception level of the signal sent by the radio resource used for sending the request. According to one embodiment, each of the radio resources interrogated, i.e. that has received such a request, sends information to the sending radio resource, or more exactly to the sending communication node, in accordance with a predetermined format.

Advantageously, collecting all the configuration parameters received and the information representing the signal level received by the various radio resources make it possible to analyse the global (or collective) situation of the radio resources and an intelligent reconfiguration of one or more of these resources.

Figure 3:
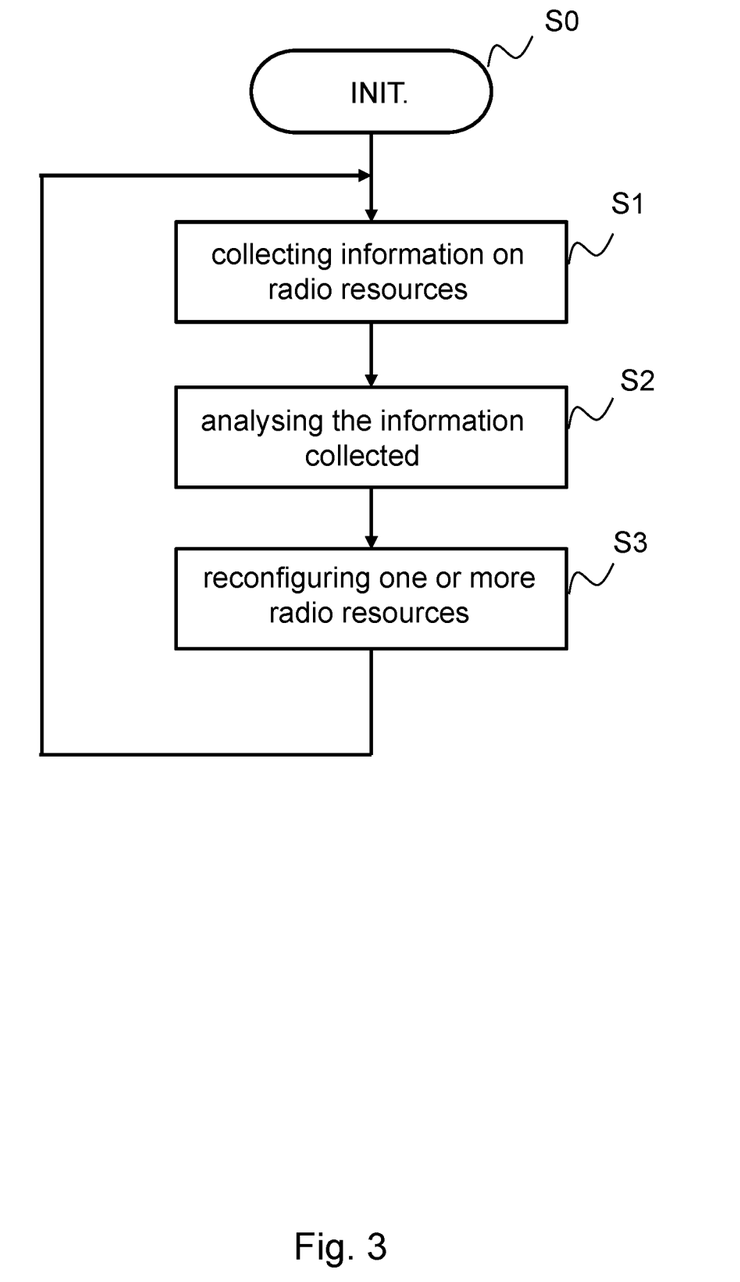
FIG. 3 is a flow diagram illustrating the steps of a method for configuring a radio resource of the communication network shown in FIG. 1 and FIG. 2.

FIG. 3 illustrates a method for configuring at least one radio resource of the communication network 1 according to an embodiment wherein the method is executed in the gateway communication node 12. A first step S0 is an initialisation step at the end of which the communication network 1 is normally operational in the configuration shown in FIG. 1. At the end of this step S0, the node devices 12, 16 and 17 cooperate in implementing the functions of the backhaul subnetwork, apart from the specific functions such as functions particular to the network gateway 12 (demodulation of signals, access control, routing, security, for example) or the functions of the set-top box 17 (reception of audiovisual data, demultiplexing, decoding and restitution of audio and video programs). The relay communication device 16 for its part implements its functions of relay between the gateway 12 and the user devices that are connected to its radio resource 162.

In a step S1, the node device 12 initiates a collection of data from all or some of the radio resources of the communication network that are accessible to it. For example, the communication node device 12 configures its radio resource 121 in order successively to scrutinise in reception all the channels for which it can be programmed. The node device 12, for each of the successively programmed channels, proceeds with a recording of information representing the electromagnetic environment coming from the other radio resources of the communication network 1, including in particular configuration parameters such as the SSIDs transmitted, the BSSIDs transmitted, the frequency band in which the observed channel is located, and the level of the signal received for each of the radio resources visible and scrutinised, and the noise level on the channel.

At a step S2, the node device 12 performs an analysis of the configuration parameters thus collected, and of at least one parameter representing a reception level of a signal sent by the radio resources. According to one embodiment, the parameter representing a level of reception by a radio resource is the "Received Signal Strength Indicator" or "RSSI". Thus, according to the example described in FIG. 1, the communication node device 12, which executes the method, detects, for example, that the radio resource 171 is transmitting with an SSID value common with its own radio resource 121, i.e. the radio resources 121 and 171 participate in the coverage of the same local area network. In other words, the communication node 17 belongs to the same group of communication nodes as the communication node 12, namely the backhaul subnetwork of the communication network 1. In addition, the power of the signal transmitted by the radio resource 171, seen from the radio resource 121, indicates great proximity between the two radio resources (for example with a read RSSI greater than −25 dBm), of such a nature as to interfere with the communications from one, the other, or both communication nodes 12 and 17. Furthermore, it is not advantageous to have two radio resources having the same characteristics at the same place, and distancing between these radio resources would be useful to the extension of the coverage of the network in the absence of any reconfiguration.

According to a variant, the communication node 12 implements the collection of the configuration parameters and signal reception levels not by performing a frequency scan, but by addressing requests to the accessible communication nodes, such as the communication nodes 16 and 17 for example; these requests being defined in accordance with a predetermined protocol and being aimed at seeking the sending of the configuration parameters and reception levels of the signal sent by the communication node 12, seen by each of the radio resources. This information may for example be procured by the internal circuits of a radio resource (radio chipset). According to this variant, each of the communication nodes 16 and 17 sends the information requested to the communication node 12, in response to the request sent by the latter. Still at step S2, and when great proximity between two adjacent radio resources, of such a nature as to cause interference, is detected, a connection test is performed with a view to determining whether the communication nodes the proximity of which is prejudicial to the global performance of the communication network are interconnected by a cable link. Thus, in the example cited and illustrated in FIG. 1, the equipment constituting the communication nodes 12 and 17 are physically superimposed, and the radio resources 121 and 171 interfere with each other so that stability problems may arise in the communications from or to these radio resources.

When an excessively great proximity is thus detected between two radio resources, and therefore between two communication nodes, and a cable connection exists between these two nodes, a new configuration of at least one of these adjacent radio resources is implemented. According to one embodiment, the new configuration is such that the cable link is used for the communication between the two adjacent node devices displaying great proximity, and the reprogrammed radio resource is used otherwise than according to the initial configuration. For example, a radio resource allocated to the operation of the backhaul subnetwork in a given configuration may be allocated to the fronthaul user subnetwork in a new configuration. Thus, if the SSID presented by the radio resource 121 is identical to the SSID presented by the radio resource 171, it is considered that these two radio resources have a common value of their configuration parameter consisting of the SSID. According to other examples, a common configuration parameter value detected may be a BSSID, a bandwidth, or a channel, this list not being exhaustive.

According to the example cited, the radio resource 171 of the communication node 17, initially used for communications in the backhaul subnetwork of the communication network 1, is reconfigured for being used in the fronthaul subnetwork of the communication network 1. The communications of the backhaul subnetwork between the communication node 12 and the communication node 17 are then implemented by means of the cable connection 13. This new configuration, illustrated in FIG. 2, allows a connection of user devices, such as the user device 173, to the communication network 1 via the radio resource 171 of the communication node 17. It is therefore considered that the new configuration of the reconfigured radio resource does not include the configuration parameter value that was common with another radio resource before reconfiguration, or that, in other words, the common value of a configuration parameter between two radio resources detected as being positioned very close to each other is absent from the new configuration to avoid possible interference. For example, if two very close radio resources are operating on the same channel, identified by a channel number (for example the channel "6"), this common value will be absent from the new configuration in order to replace it with another value of the corresponding configuration parameter, here the channel "11". According to the same reasoning, the configuration parameter value detected as being common may be a subnetwork identifier (for example equal to 0 for the backhaul subnetwork and to 1 for the fronthaul user subnetwork). Thus, if before the reconfiguration step the two radio resources are operating in the same backhaul subnetwork, and one of them is reconfigured to operate in the fronthaul user subnetwork, the common subnetwork identifier value 0 is absent from the new configuration of the radio resource newly allocated to the fronthaul user subnetwork. The parameter that is the subnetwork identifier takes the value 1 for the reconfigured radio resource. According to yet another example, if the common value of a configuration parameter detected is an SSID, for example "home network", this SSID will not be present in the new configuration and, by way of example, will be able to be replaced by a different SSID, such as "living-room network".

According to another example of reconfiguration, when the proximity of the radio resource 121 and of the radio resource 171 is detected, and the communications of the backhaul subnetwork between the communication node 12 and the communication node 17 are then implemented by means of the cable connection 13, the radio resource 171 is deactivated if it is not possible to coordinate reconfiguration thereof in favour of the fronthaul subnetwork of the communication network 1. This impossibility may arise if there is a risk that the reconfiguration of the radio resource 171 will disturb the radio resource 172.

According to one embodiment, the cable connection test between two node devices is performed by an exchange of protocol messages between these two node devices, for example by sending a "ping" command designed to test the availability of an item of equipment through a network by sending echo commands to a predetermined IP address or a predetermined host name.

According to one embodiment the step S1 of collecting parameters and information relating to the radio resources relates only to items of equipment for which it can be considered that these items of equipment normally present the risk of being physically disposed close to each other, because of their respective functions in the communication network 1. For example, the collection step S1 may concern only communication nodes of the gateway and set-top box type, or of the gateway and printer type. According to this variant, the type or the function of each of the items of equipment is determined during an installation operation or according to an identifier of the equipment, such as its MAC address, for example.

According to one embodiment, a proximity of such a nature as to generate interference in communications between a radio resource of a first communication node and a radio resource of a second communication node is detected as soon as the RSSI of a signal sent by the radio resource of the first communication node and received by the radio resource of the second communication node is above a predetermined threshold, or vice versa. According to one embodiment, this threshold lies in a range of values from −40 dBm to −25 dBm, and preferentially this threshold is between −30 dBm and −25 dBm, and even more preferentially this threshold is equal to −25 dBm.

According to one embodiment, the method is executed in a communication node known as the "master node" of the communication network 1. The master node supervises the aforementioned collection, analysis and configuration operations. According to a variant, the method is executed by a remote device configured for communicating with the communication nodes of the communication network 1. For example, such a remote device may be included in the wide area network 10 and be made available by a service provider administering communication networks.

According to one embodiment, when it is considered that two communication nodes are sufficiently close for the proximity thereof to be considered to be of such a nature as to cause interference in the operation thereof, the method can be executed by one, the first of these two communication nodes, by the other, the second of these two communication nodes, or by a third-party communication node. In the latter case, the reception level of the signal making it possible to detect great proximity is substantially identical when the power of the measured signal is that of the signal sent by the first communication node and when the power of the measured signal is that of the signal sent by the second communication node. Thus, for example, if the set-top box 17 is positioned stacked on top of the gateway 12, it is highly probable that the level of the signal sent by the radio resource 121 of the gateway 12 will appear to be slightly weaker than the level of the signal sent by the radio resource 171 of the set-top box 17 when the measurement is made from the radio resource 161 of the communication node 16, although the two levels of the signal received by the radio resource 161 are substantially of the same order of magnitude.

According to one embodiment, all the communication nodes of the communication network are configured for exchanging information representing the respective configurations thereof with other communication nodes according to a predetermined common protocol. Such a protocol is not described here in more detail since the description thereof is not necessary for understanding the invention.

Figure 4:
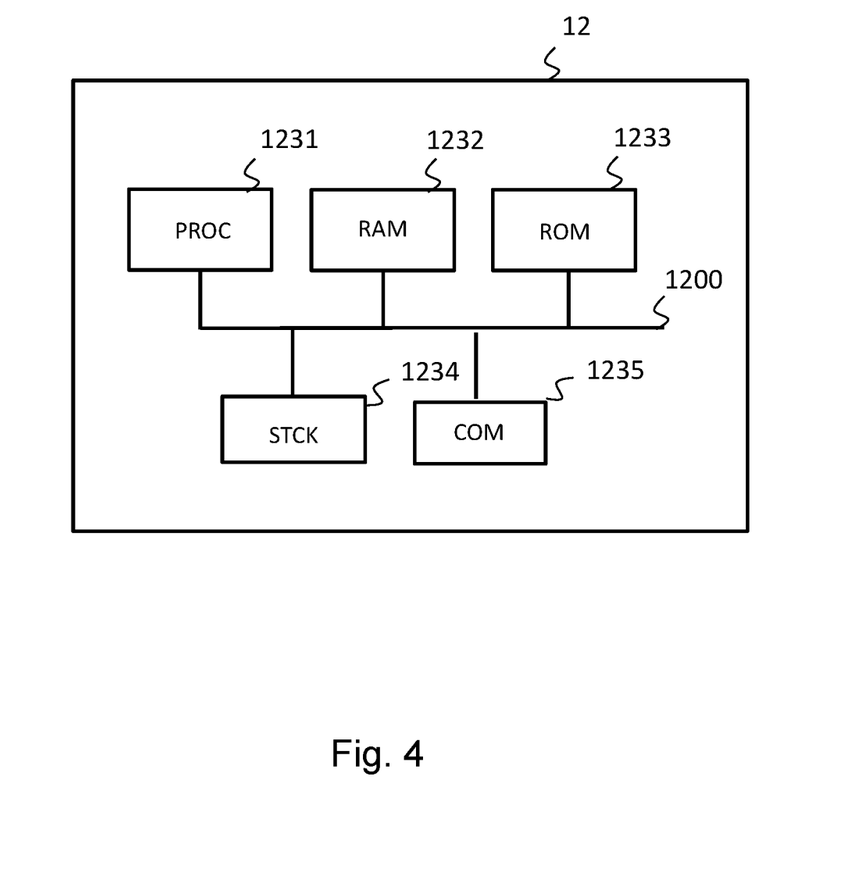
FIG. 4 is a schematic representation of a communication node of the communication network shown in FIG. 1 and FIG. 2.

FIG. 4 illustrates schematically an example of internal architecture of any communication node device of the communication network 1. Let us consider by way of illustration that FIG. 4 illustrates an internal arrangement of the communication node device 12. It should be noted that FIG. 4 could also illustrate schematically an example of hardware architecture of a processing module included in the communication node device 12, such as circuitry for collecting and analysing radio resource parameters or information relating to the operation of one or more radio resources of the communication network 1.

According to the example of hardware architecture shown in FIG. 4, the communication node device 12 then comprises, connected by a communication bus 1200: a processor or CPU (central processing unit) 1231; a random access memory RAM 1232; a read only memory ROM 1233; a storage unit such as a hard disk (or a storage medium reader, such as an SD (Secure Digital) card reader 1234; at least one communication interface 1235 enabling the communication node device 12 to communicate with the other node devices of the communication network 1, such as for example the node devices 16 and 17.

The processor 1201 is capable of executing instructions loaded in the RAM 1232 from the ROM 1233, from an external memory (not shown), from a storage medium (such as an SD card), or from a communication network. When the communication node device 12 is powered up, the processor 1231 is capable of reading instructions from the RAM 1232 and executing them. These instructions form a computer program causing the implementation, by the processor 1231, of all or part of the method described in relation to FIG. 3.

All or part of the method described in relation to FIG. 3 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the communication node device 12 comprises electronic circuitry configured for implementing the methods described in relation to the communication node device 12 (and likewise for the communication nodes 16 and 17). Obviously the communication node device 12 also comprises all the elements usually present in a system comprising a control unit and the peripherals thereof, such as a power supply circuit, a power-supply monitoring circuit, one or more clock circuits, a reset circuit, input/output ports, interrupt inputs or bus drivers. This list being non-exhaustive.

The invention claimed is:

1. A method for configuring radio resources distributed in a plurality of communication nodes of a communication network comprising a backhaul subnetwork and a fronthaul user network, each communication node comprising one or more of said radio resources implemented by a radio chipset, the method being executed in a communication node of said communication network, wherein the method comprises:

collecting, for each of said radio resources, configuration parameters, and at least one of the configuration parameters representing a reception level of a signal sent or received by said each of said radio resource, detecting, from said collected radio-resource configuration parameters, and from the at least one of said configuration parameters representing the reception level, a common configuration parameter value and a proximity between a radio resource of a first communication node and a radio resource of a second communication node from said plurality of communication nodes, of such a nature as to cause interference in communications between the first and second communication nodes, said radio resources of the first and second communication nodes being configured for implementing transmissions in the backhaul subnetwork, configuring at least the radio resource of the second communication node having the common configuration parameter value so as to have a new configuration such that said common configuration parameter value is absent from the new configuration and said radio resource of the second communication node being configured for implementing transmissions in the fronthaul user network after said configuring, detecting at least one cable link between the first and second communication nodes so that communications made by a wireless link between the first and second communication nodes are made by the at least one cable link after said configuring.

2. The method for configuring radio resources according to claim 1, wherein the detecting the at least one cable link comprises an exchange of messages between the first and second node devices via communication interfaces configured for being connected by the at least one cable link.

3. The method for configuring radio resources according to claim 1, wherein the at least one parameter representing the reception level is a RSSI reception power level of a signal coming from an antenna of one of the plurality of communication nodes.

4. The method for configuring radio resources according to claim 1, wherein the at least one configuration parameter having a common configuration parameter value between two communication nodes is from the group: an SSID, a BSSID, a frequency band, a channel or a bandwidth.

5. A communication node device comprising electronic circuitry configured for making transmissions with a plurality of communication nodes of a communication network comprising a backhaul subnetwork and a fronthaul user network, and for configuring one or more radio resources distributed in said plurality of communication nodes, each communication node comprising one or more radio resources, the communication node device being configured for:

collecting, for each of said radio resources, configuration parameters, and at least one of the configuration parameters representing a reception level of a signal sent or received by said each of said radio resource, detecting, from said collected radio-resource configuration parameters, and from the at least one of said configuration parameters representing the reception level, a common configuration parameter value and a proximity between a radio resource of a first communication node and a radio resource of a second communication node from said plurality of communication nodes, of such a nature as to cause interference in communications between the first and second communication nodes, said radio resources of the first and second communication nodes being configured for implementing transmissions in the backhaul subnetwork, configuring at least one radio resource of the second communication node so as to have a new configuration such that said common configuration parameter value is absent from the new configuration and said radio resource of the second communication node being configured for implementing transmissions in the fronthaul user network after said configuring, detecting at least one cable link between the first and second communication nodes so that communications made by a wireless link between the first and second communication nodes are made by the at least one cable link after said configuring.

6. A wireless communication network comprising a plurality of communication node devices according to claim 5.

7. A non-transitory information storage medium embodying a computer program product, wherein the computer program product comprises program code instructions for performing the method according claim 1, when said program is executed by a processor of a communication node device.

* * * * *